US010819793B2

(12) United States Patent
Rose et al.

(10) Patent No.: US 10,819,793 B2
(45) Date of Patent: Oct. 27, 2020

(54) METHOD AND APPARATUS FOR EXTENDING CONTENT ACCESS

(71) Applicants: AT&T MOBILITY II LLC, Atlanta, GA (US); THE DIRECTV GROUP, INC., El Segundo, CA (US)

(72) Inventors: Todd Rose, Marietta, GA (US); Brian Greaves, Atlanta, GA (US); Stephen H. Chu, Tarzana, CA (US)

(73) Assignees: AT&T Mobility II LLC, Atlanta, GA (US); The DIRECTV Group, Inc., El Segundo, CA (US)

( * ) Notice: Subject to any disclaimer, the term of this patent is extended or adjusted under 35 U.S.C. 154(b) by 173 days.

(21) Appl. No.: 15/266,305

(22) Filed: Sep. 15, 2016

(65) Prior Publication Data

US 2018/0077211 A1 Mar. 15, 2018

(51) Int. Cl.
*H04L 29/08* (2006.01)
*H04W 4/48* (2018.01)
(Continued)

(52) U.S. Cl.
CPC .......... *H04L 67/12* (2013.01); *H04L 41/0806* (2013.01); *H04N 21/414* (2013.01);
(Continued)

(58) Field of Classification Search
CPC .... H04L 67/12; H04L 41/0806; H04W 88/06; H04W 4/48; H04M 1/6091; B60K 2370/589; H04N 21/41422; H04N 21/414
See application file for complete search history.

(56) References Cited

U.S. PATENT DOCUMENTS

| 7,285,004 B1 | 10/2007 | Fukuda et al. |
| 7,349,722 B2 | 3/2008 | Geerlings et al. |

(Continued)

FOREIGN PATENT DOCUMENTS

| WO | 2015022026 A1 | 2/2015 | |
| WO | WO-2017046789 A1 * | 3/2017 | ............. G06F 21/56 |

OTHER PUBLICATIONS

Jason Cipriani et al., "Apple CarPlay: A guide to connecting your iPhone to your car", CNET, May 24, 2016, pp. 1-6. (Year: 2016).*
(Continued)

*Primary Examiner* — Gregory G Todd
(74) *Attorney, Agent, or Firm* — Guntin & Gust, PLC; John G. Rauch

(57) ABSTRACT

Aspects of the subject disclosure may include, for example, a method including receiving, by a processing system comprising a processor, media content from a media processor device via a first wireless communication network, where the media content can be received at the media processor device from a subscription media source. The method can include storing the media content received from the media processor device, initiating a first connection to an in-vehicle communication system, accessing a second wireless communication network generated by the in-vehicle communication system, initiating a second connection, via the second wireless communication network, to a media device detected on the second wireless communication network, and transmitting a stream of the media content to the media device via the second wireless communication network, wherein the media device reproduces the media content from the stream of the media content. Other embodiments are disclosed.

20 Claims, 10 Drawing Sheets

(51) Int. Cl.
*H04N 21/414* (2011.01)
*H04L 12/24* (2006.01)
(52) U.S. Cl.
CPC ........ *H04N 21/41422* (2013.01); *H04W 4/48* (2018.02); *B60K 2370/589* (2019.05)

(56) References Cited

U.S. PATENT DOCUMENTS

| | | | |
|---|---|---|---|
| 7,382,771 | B2 | 6/2008 | Leblanc et al. |
| 8,169,311 | B1 | 5/2012 | Breed et al. |
| 8,432,260 | B2 | 4/2013 | Talty et al. |
| 8,630,233 | B2 | 1/2014 | Kwon et al. |
| 8,914,077 | B2 | 12/2014 | Sakata et al. |
| 9,008,906 | B2 | 4/2015 | Ricci et al. |
| 9,055,022 | B2 | 6/2015 | Ricci et al. |
| 9,083,581 | B1* | 7/2015 | Addepalli ............ H04W 4/046 |
| 9,202,527 | B2 | 12/2015 | Morgan et al. |
| 9,338,170 | B2 | 5/2016 | Ricci |
| 2004/0225519 | A1 | 11/2004 | Martin et al. |
| 2009/0275285 | A1* | 11/2009 | Maricevic ........... H04W 56/001 455/41.3 |
| 2010/0138856 | A1 | 6/2010 | Anglin et al. |
| 2010/0235891 | A1* | 9/2010 | Oglesbee ............ H04L 67/1095 726/5 |
| 2011/0032075 | A1 | 2/2011 | Alrabady et al. |
| 2011/0313593 | A1* | 12/2011 | Cohen .................. G01S 5/0027 701/2 |
| 2012/0039248 | A1 | 2/2012 | Schneider et al. |
| 2013/0028157 | A1 | 1/2013 | Ruster et al. |
| 2013/0039352 | A1 | 2/2013 | Ruster et al. |
| 2013/0055096 | A1 | 2/2013 | Kim et al. |
| 2013/0332632 | A1 | 12/2013 | Rathi et al. |
| 2014/0222972 | A1* | 8/2014 | Thomas .............. G06F 16/1727 709/219 |
| 2014/0279122 | A1 | 9/2014 | Luna et al. |
| 2014/0310739 | A1* | 10/2014 | Ricci ....................... H04W 4/21 725/28 |
| 2015/0181286 | A1 | 6/2015 | Gonzalez |
| 2016/0044519 | A1* | 2/2016 | Bai ........................ H04W 48/18 370/252 |
| 2016/0050694 | A1 | 2/2016 | Pfaffinger et al. |
| 2016/0174275 | A1* | 6/2016 | Ji ....................... H04M 1/72527 455/422.1 |
| 2016/0197783 | A1* | 7/2016 | Hort ........................ H04L 69/18 709/222 |
| 2017/0075701 | A1* | 3/2017 | Ricci ..................... G06F 9/4443 |
| 2017/0197512 | A1* | 7/2017 | Klesyk ................ B60L 11/1838 |
| 2017/0270067 | A1* | 9/2017 | Hu ......................... G06F 13/366 |
| 2017/0311008 | A1* | 10/2017 | Petersen .......... H04N 21/41407 |
| 2018/0225230 | A1* | 8/2018 | Litichever ............... G06F 21/56 |

OTHER PUBLICATIONS

Audi, Infotainment and Audi connect, Jun. 29, 2015, Audio MediaCenter, https://www.audi-mediacenter.com/en/high-tech-all-the-way-the-new-audi-a4-and-a4-avant-4328/infotainment-and-audi-connect-4335, pp. 1-3 (Year: 2015).*
Zac Hall, "iOS 9: The state of CarPlay in 2015 + what's new", Sep. 22, 2015, https://9to5mac.com/2015/09/22/ios-9-carplay-walkthrough/ pp. 1-19. (Year: 2015).*
Smith, Levi, "How to stream movies to an iPad in your car", It's Worth Noting, itsworthnoting.com, Jan. 14, 2013.
Sprinkle, Tim, "Digital Music in Your Car", CrushField®, crutchfield.com, Feb. 11, 2016.

* cited by examiner

100

285

285

METHOD AND APPARATUS FOR EXTENDING CONTENT ACCESS

FIELD OF THE DISCLOSURE

The subject disclosure relates to a method and apparatus for extending content access.

BACKGROUND

Content, including media content, is typically experienced by consumers via devices such as computers, televisions, radios, and mobile electronics. Media content can be delivered by service providers, who send the content, such as television, radio, and video programming, to consumers for enjoyment at their physical locations. Modern communications networks benefit from interconnectivity between consumers and various communication devices. As network capabilities expand, these interconnections can provide new opportunities to enhance the ability for consumers to enjoy content by experiencing a variety of content over multiple devices. Intelligent devices offer means for the enjoyment of content in ways that anticipate consumer personalization of media content presentation.

BRIEF DESCRIPTION OF THE DRAWINGS

Reference will now be made to the accompanying drawings, which are not necessarily drawn to scale, and wherein.

DETAILED DESCRIPTION

Figure 1:
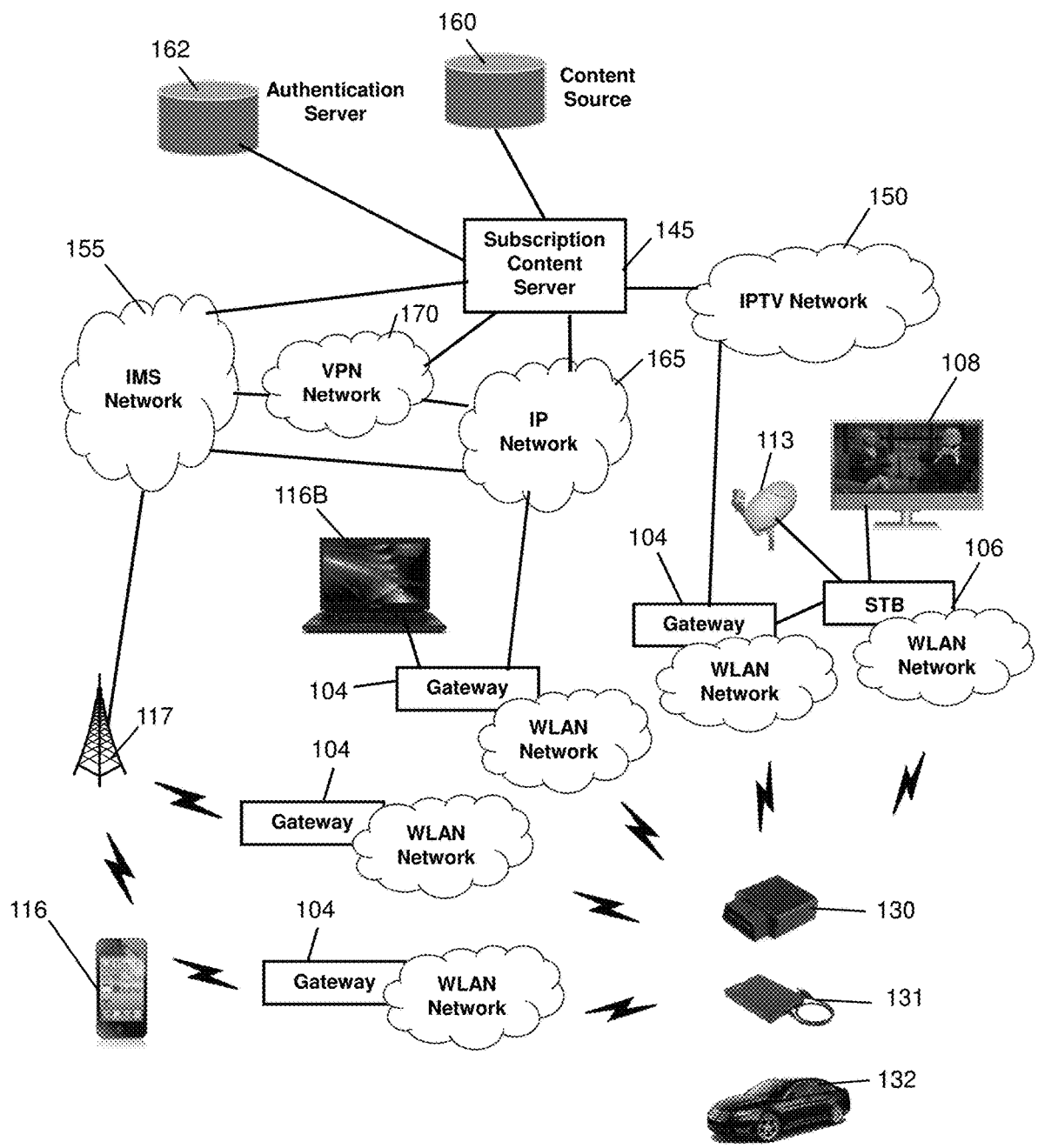
FIG. 1 depicts illustrative embodiments of a system that can be utilized for distributing content via communication networks.

The subject disclosure describes, among other things, illustrative embodiments for a means for extending content accessibility. A storage device can connect to a wireless local area network (WLAN) at a user premises. The WLAN can include a device that is subscribed to a content source, such as a subscription television service. Portable or local storage on the storage device can download and store content from the subscription content source. Subsequently, the storage device can be plugged into a power source at a vehicle, such as an On-Board Diagnostic (OBD) port or a USB port, or can be powered from another remote source. The storage device can determine that it is powered up at a vehicle or other remote location and can generate a wireless communication signal in support of its own WLAN. The storage device can then stream the stored content to a receiving device via its WLAN, such that accessibility to the content is extended to a remote location, such as a vehicle. The storage device can, alternatively, use resources of an in-vehicle entertainment/communication system for sharing the stored content. The storage device can be portable or can be installed or built into a vehicle. Other embodiments are described in the subject disclosure.

One or more aspects of the subject disclosure include a machine-readable storage medium, including executable instructions that, when executed by a processing system including a processor, facilitate performance of operations, including detecting a power supply signal and, in turn, determining whether the power supply signal is a premises power supply signal or a vehicle power supply signal. Responsive to determining that the power supply signal is the premises power supply signal, the operations can include initiating a communication session with a media processor device over a first wireless communication network, receiving media content from the media processor device via the first wireless communication network, and, in turn, storing the media content received from the media processor device. The media content can be received at the media processor device from a subscription media source. Responsive to determining that the power supply signal is the vehicle power supply signal, the operations can include accessing a second wireless communication network, initiating a first connection, via the second wireless communication network, to a media device detected on the second wireless communication network, and, in turn, transmitting a stream of the media content to the media device via the second wireless communication network. The media device can reproduce the media content from the stream of the media content.

One or more aspects of the subject disclosure include a storage device including a processing system including a processor and a memory that stores executable instructions that, when executed by the processing system, facilitate performance of operations, including receiving media content from a media processor device via a first wireless communication network. The media content can be received at the media processor device from a subscription media source. The operations can also include storing the media content received from the media processor device, and accessing a second wireless communication network. The operations can further include connecting to a vehicle power supply signal and generating a second wireless communication network responsive to connecting to the vehicle power supply signal. The operations can include initiating a first connection, via the second wireless communication network, to a media device detected on the second wireless communication network, and, in turn, transmitting a stream of the media content to the media device via the second wireless communication network, wherein the media device reproduces the media content from the stream of the media content.

One or more aspects of the subject disclosure include a method including receiving, by a processing system including a processor, media content from a media processor device via a first wireless communication network. The media content can be received at the media processor device from a subscription media source. The method can include storing, by the processing system, the media content received from the media processor device. The method can further include initiating a first connection, by the processing system, to an in-vehicle communication system, and, in turn, accessing, by the processing system, a second wireless communication network generated by the in-vehicle communication system. The method can include initiating a second connection, by the processing system and via the second wireless communication network, to a media device detected on the second wireless communication network, and, in turn, transmitting, by the processing system, a stream of the media content to the media device via the second wireless communication network, wherein the media device reproduces the media content from the stream of the media content.

FIG. 1 depicts illustrative embodiments of a system that can be utilized for distributing content via communication networks. In one embodiment, the system 100 can incorporate a subscription content server 145. For example, the subscription content server 145 can be part of a cable, satellite, fiber optic, and/or DSL based media content delivery system. Content can be any type of content, such as broadcast television, cable or premium television, video on demand, or pay-per-per view television. The content can be software content, including entire software programs, upgrades to programs, and/or additions to programs. Content can be subscription-based, such as basic cable, premium cable, or movie channel content. Content can also include non-subscription content, such as "free" Internet-based content of over-the-air television content and/or single offers including personal media or purchases of content.

In one embodiment, the system 100 can include one or more subscription content servers 145 that can receive content from one or more content sources 160. Subscription content servers 145 can provide content to one or more delivery networks 150, 155, and 165. For example, a content source 160 can deliver media content services via an internet protocol television (IPTV) network 150, an internet protocol multimedia subsystem network 155, and/or an internet protocol network. In one embodiment, content can be delivered via satellite reception 113, where the subscription content server 145 can control authentication and viewing rights.

In one or more embodiments, content can be routed to an IPTV network 150, which, in turn can deliver content to a gateway device 104. In turn, the gateway device 104 can route content to a media processor device 106, such as a set-top box. In another embodiment, the subscription content server 145 can deliver content via an IMS network 155 to a mobility network 117. The mobility network 117 can route content to a mobile communication device 116, such as a wireless smart phone, via a cellular, long term evolution (LTE) network, third generation (3G) network, second generation (2G) network, and/or fourth generation (4G) wireless network. In one embodiment, the mobile communication device 116 can forward content that it receives over the mobility network 117 to, for example, a gateway device 104 using a mobile hotspot Wi-Fi link. In another embodiment, the subscription content server 145 can deliver content over a public IP network 165. In turn, the IP network 165 can deliver content through a gateway device 104 to a computer devices 116. Devices 116B that receive media content via the IP network 165 can, in turn, share the media content via direct connections, such as a USB port, or via a wireless connection, such as Wi-Fi. In another embodiment, the subscriber content server 145 can route content via a virtual private network (VPN) 170.

The system 100 can further include authentication functions to insure that media content is distributed only to verified subscribers of the system 100, the networks 150, 155, 165, and 170, and/or the media content sources 160 according to service plan levels of those subscribers. For example, the system 100 can verify that a media processor device 106 is properly identified and validated for receiving media content over the system 100. For example, one or more authentication servers 162 can be used to verify the subscription status of the media processor device 106 or any other device to which content is made available. Device identifying information, such as MAC address, IP address, and/or SIM card information, can be transmitted to the authentication server 162 via the network. The authentication server 162 can use this identifying information from a media processor device 106 to inquire at a subscriber database of service plan information for a subscriber who is associated with the device 106. The subscriber database can provide subscription status and service plan information to allow the authentication server to enable delivery of purchased media content to the media processor device 106. In one or more embodiments, the media content can be selected based on a number of techniques and criteria, such as based on user input, user preferences, user profiles, monitored user viewing history, and so forth.

In one or more embodiments, gateway devices 104 can function as interfaces between the network 150, 155, 165 and the user device 106, 116, 116B. In one embodiment, a gateway device 104 can provide internet working functions, such as protocol translation, impedance matching, data rate conversion, and/or fault isolation necessary for exchanging data between a network 150 and a premises-based device 106. In one embodiment, a gateway device 104 can provide access to a public IP network 165 of the system 100. The public IP network 165 can facilitate communications to Internet-based applications, websites, and databases, such as Social Media sites and Web Databases. This connectivity can allow devices 116 and servers 145 in the system 100 to access and be accessed by the various Internet-based applications, websites, and/or databases.

In one or more embodiments, devices, as mobile communication devices 116 can receive content through various network pathways. For example, a device 116 can receive content via wireless communication with a cellular base station 117 of a mobility network 155, wireless communication with a gateway device 104 coupled to an IPTV network 150, and/or wireless communication with a gateway device 104 coupled to an IP network 165. The device 116 can also receive content via wireless connection with a computer device 116B or a media device 108, or a media processor device 106. At any given moment, a mobile communication device 116 can receive wireless communication signals from many cellular sources, local area network sources (e.g., WiFi networks), and/or short range sources (e.g., Bluetooth™).

In one or more embodiments, gateway devices 104 can be included in the premises for supporting LAN communications. For example, a gateway device 104 can be coupled to a media processor device 106 that provides subscription content to a media device 108 via an IPTV network 150. The gateway device 104 can support a LAN that can share this subscription content, either directly from the IPTV network 150 or indirectly from the media processor device 106. In another example, the media processor device 106 can support its own WLAN for connection to nearby devices. In another example, a gateway device 104 can receive subscription content over the IP Network 165 and provide this subscription content to a computer device 104. This gateway device 104 can support a LAN and/or WLAN network for sharing this content with other devices. In another example, a gateway device can receive content from a wireless mobility network, such as an IMS network 155, via a mobility network cell 117. This gateway device 104 can include a means of receiving cellular signals and can further be in the form of a femto cell or a micro cell for extending cellular capabilities in buildings or other locations. The gateway device 104 can support its own LAN and/or WLAN network for sharing content. In another example, a mobile communication device 116 can receive subscription content via a cellular network or via a local WiFi network and can, in turn, share this content via its own LAN (i.e, local hot spot capability) or a LAN and/or WLAN from a nearby gateway 104.

In one or more embodiments, the system 100 can use the above-described capabilities of distribution of subscription content and multiple data pathways to provide subscription content to other device types. In particular, a storage device 130-132 can be introduced into the system 100 for purposes of receiving subscription content. In one or more embodiments, the storage device 130-132 can comprise, for example, a portable On-Board Diagnostics (OBD) device 130, a portable Universal Serial Bus (USB) device 131, or a vehicle 132 with a built-in storage device. In one embodiment, the storage device 130-132 can include a wireless interface. With the wireless interface, the storage device 130-132 can communication with and/or connect to one or more LAN and/or WLAN networks present at the premises using a wireless interface such as WiFi or Bluetooth™. In one or more embodiments, the storage device 130-132 can detect and/or be detected by LAN and/or WLAN networks in the premises and can connect with these LAN and/or WLAN networks after detection.

In one or more embodiments, the storage device 130-132 can include an interface. The interface can include an ability to provide power to the storage device 130-132. For example, a power cord can connect to the storage device 130-132 via the interface to provide power. Where the storage device 130 is an OBD device 130 (i.e., capable of plugging directly into an OBD port of a vehicle), then an OBD-compatible connection on the storage device 130 can be used to electrically and mechanically connect with an OBD data channel of a vehicle. Where the storage device 131 is a USB device 131, then a USB-compatible connection on the storage device 131 can be used to electrically and mechanically connect with a USB data channel on a remote device, such as a vehicle or a remote computer device. Where the storage device 132 is a vehicle-based device 132 (i.e., the storage device 132 is built into or installed in a vehicle), then the storage device 132 is connected to an electrical/electronic system within the vehicle from which the storage device 132 derives its power. In one embodiment a simple power connection or DC pin connector, as is common to AC-to-DC transformers can be connected to the storage device 130-132 from an external source. In one embodiment, the interface to the storage device 130-132 can include multiple connections and/or connection types. For example, a storage device 130-132 can include both an OBD connection and a USB connection.

In one or more embodiments, the storage device 130-132 can operate in at least two modes—storage mode and broadcast mode. In storage mode, a storage device 130-132 can receive from a WLAN and then store this content for later playback. In broadcast mode, the storage device 130-132 can broadcast this content as a data stream. In one or more embodiments, the storage device 130-132 can determine its mode of operation based on inputs at its interface. For example, the storage device 130-132 can detect the presence of different input signals at its interface when the device 130 is in use at a premises and/or in the presence of a WLAN in contrast to when the storage device 130-132 is in use at a remote setting or away from the WLAN. For example, in a remote setting, an OBD storage device 130 or a USB storage device 131 can sense connection to an OBD data channel or a USB channel or a vehicle by sensing signal levels present at pins of the OBD or USB port. By contrast, in a premises setting, the OBD storage device 130 or USB storage device 131 can sense that OBD/USB signals are absent or are at incorrect voltage levels for vehicle operation. The OBD storage device 130 or USB storage device 131 can thus determine whether it is operating locally or remotely (premises or in-vehicle) according to these levels and can select the operating state accordingly.

In one or more embodiments, the storage device 130-132 can detect the presence of WLAN networks and/or WiFi signals and can determine, from these wireless communication signals, whether the storage device 130-132 is operating at a premises, where data can be downloaded from the premises WLAN, or remotely, where the downloaded data can be broadcast from the storage device 130-132 for use by other devices in the remote setting. For example, an in-vehicle WLAN can include one or more identifications, such as unique addressing scheme and/or a unique header for data packets, which mark or identify the in-vehicle WLAN for the benefit of the storage device 130. When the storage device 130-132 detects the in-vehicle WLAN, then the storage device 132 can determine that it is operating in the presence of the vehicle-based WLAN and should operate in broadcast mode. Conversely, the storage device 130-132 can detect, either from the absence of the in-vehicle WLAN or from the presence of a WLAN that does not match the in-vehicle WLAN identifier, such that it is operating in the presence of a premises-based WLAN (e.g., a vehicle with a built-in storage device 132 is parked in the garage of a home with a WLAN that can provide subscription-based content to the storage device 132. In this scenario, the storage device 130-132 can decide to operate in its storage mode.

In one or more embodiments, the storage device 130-132 can be detected by one or more WLAN networks in a premises. The storage device 130-132 can connect to a WLAN network and thereby become accessible to one or more gateways 104 or other devices 106, 116, 116B at the premises. In one embodiment, the devices 106, 116, and 116B can connect to the storage device 130-132 directly, via the WLAN, where the device supports such direct connection via a near-field wireless connection.

In one or more embodiments, the storage device 130-132 can act as a slave or client device for receiving subscription content from one or more device 104, 106, 116, or 116B. In this scenario, once the storage device 130-132 is detected, a detecting device 106 can determine whether the storage device 130-132 has available storage space and, if so, can further determine what content (if any) to download to the storage device 130-132. For example, a user at a media processor device 106 can be informed by a media processor device 106, via a media device 108 (e.g., a television display), that the media processor device 106 has established communication with a storage device 130-132 via a local WLAN. In one embodiment, the media processor device 106 can query the storage device 130-132 for its current contents and available storage. The media processor device 106 can present the results of this query to the user and ask the user if she would like to transfer a copy of these contents to storage at the media processor device 106 and/or to a cloud server. The media processor device 106 can ask if the user would like to delete the contents from the storage device 130. Responsive to direction by the user, the media processor device 106 can direct movement and/or deletion of these contents.

In one or more embodiments, the media processor device 106 can ask the user if she would like to copy content from the media processor device 106 to the storage device 130. The content can be subscriber-based content and/or non-subscriber based content. For example, the media processor device 106 can allow the user to select content from an electronic programming guide (EPG) listing of current and future subscriber-based content that is available for viewing by and/or storage at the media processor device 106. The media processor device 106 can allow the user to select on-demand content that is available for free or for a fee. In another example, the media processor device 106 can allow the user to select over-air-content (e.g., content from "free" broadcast stations) and/or content that the user owns separate from any subscription service. In one or more embodiments, if the user selects subscription-based content, then the media processor device 106 can signal a subscription content server 145 to indicate an intention to download the content from a network, such as an IPTV network 150, to the media processor device 106. In one embodiment, the media processor device 106 can then simply transfer the download content to the storage device 130-132 as if this storage were part of the media processor device 106. In another embodiment, the subscription content server 145 can require the media processor device 106 to provide authenticating information for the storage device 130 before authorizing the download of the subscription-based content to the storage device 130-132. In one embodiment, the media processor device 106 can include digital rights management (DRM) information along with the subscription-based content that is downloaded to the storage device 130-132. The DRM information can limit how and/or when the subscription-based content can be transferred from the storage device 130-132 other devices.

Figure 2A:
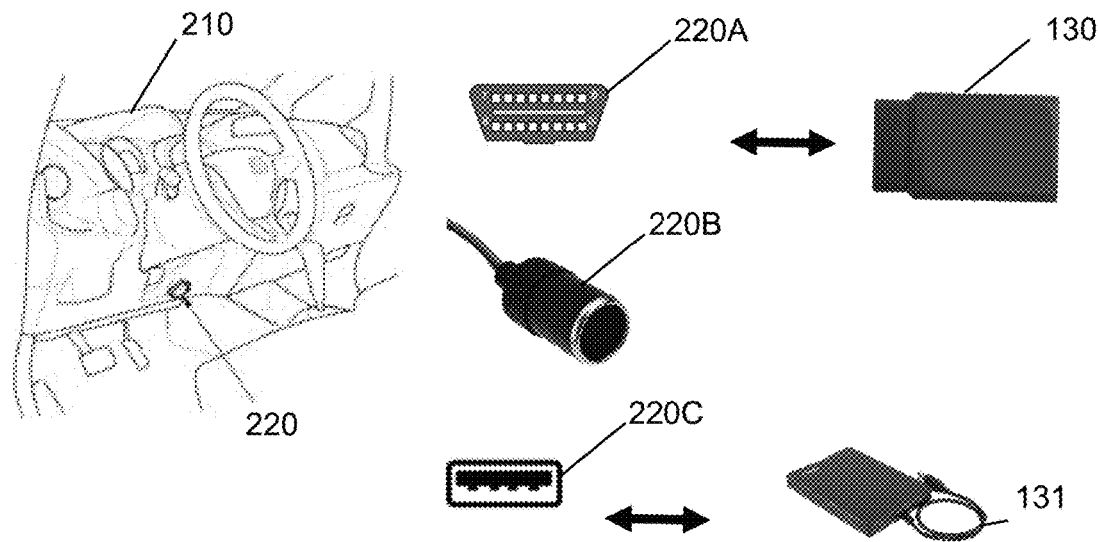
FIG. 2A-2H depicts illustrative embodiments of a system for extending access to content via a storage device.
Figure 2B:
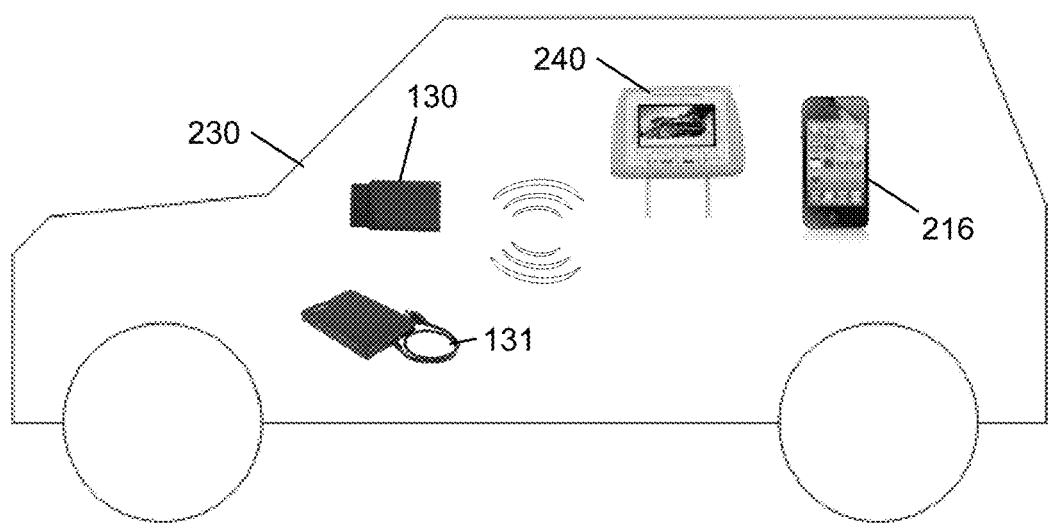

FIG. 2A-2H depicts illustrative embodiments of a system for extending access to content via a storage device. In FIGS. 2A-2B, in one or more embodiments, a vehicle system 200 is shown, where an OBD storage device 130 or a USB storage device 131 is connected to the vehicle system 200 for remote use. In FIG. 2A, a partial view of a vehicle cabin is shown with a vehicle instrument panel 210, a port 220, optional port pinouts 220A-C, and an OBD storage device 130 or a USB storage device 131. In FIG. 2B, an entire vehicle cabin 230 is shown including the storage device 130-131 and other devices 240 and 216 for receiving streaming content from the storage device 130-131 via a WLAN generated by the storage device 130-131 operating in the broadcast mode. In the vehicle system 200 of FIGS. 2A-2B, in-vehicle devices 216 and 240 can receive streaming, subscription-based content from the storage device 130-131.

Figure 2C:
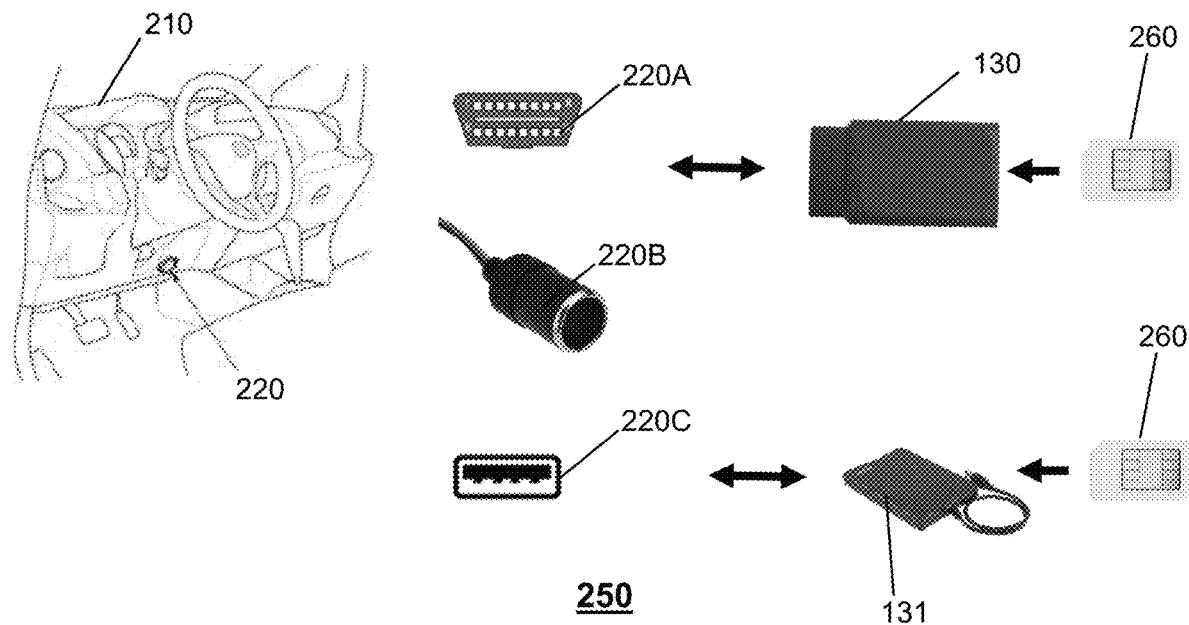
Figure 2D:
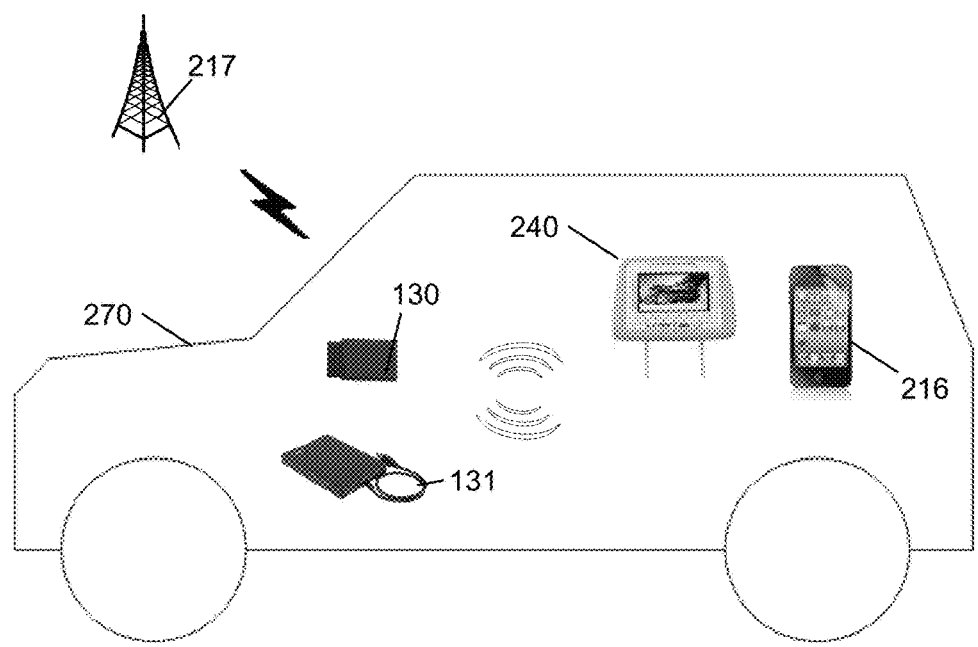

In FIGS. 2C-2D, a vehicle system 250 is shown. In FIG. 2C, in one or more embodiments, a partial view of a vehicle cabin is shown, where a subscriber identity module (SIM) card 260 can be plugged into (or built into) the OBD or USB storage device 130-131. In FIG. 2D, an entire vehicle cabin 270 is shown including the storage device 130-131 and other devices 240 and 216 for receiving streaming content from the storage device 130-131. In the vehicle system 250 of FIGS. 2C-2D, in-vehicle devices 216 and 240 can receive streaming, subscription-based content from the storage device 130-131 and can also receive content from a cellular-based wireless, communication system, where the storage device 130-131 can receiver cellular content.

Figure 2E:
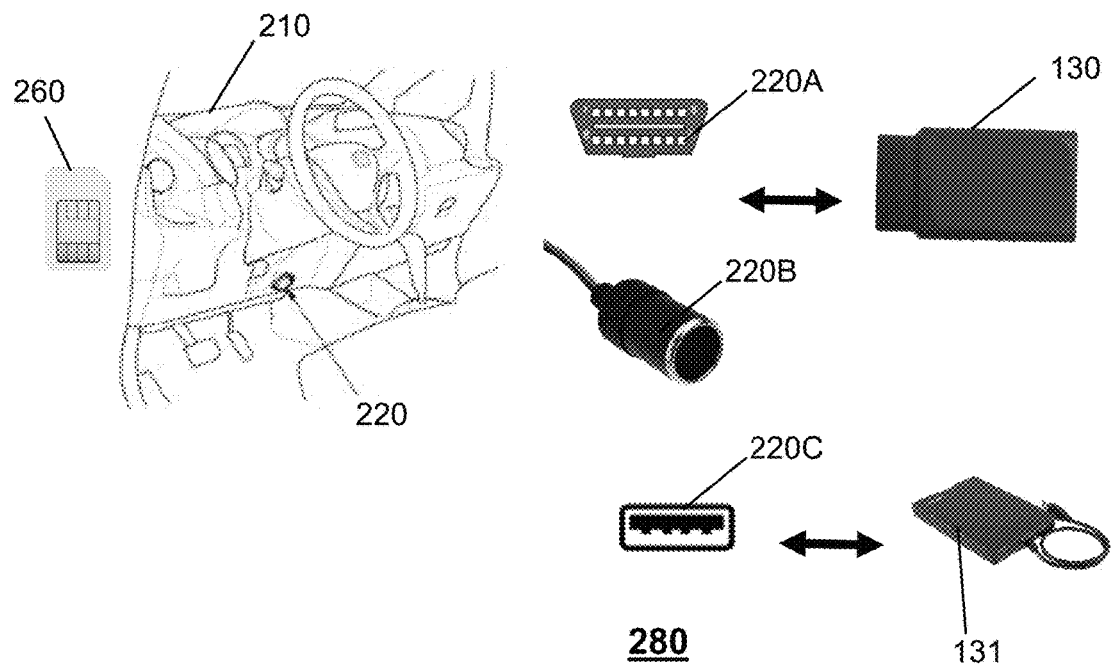
Figure 2F:
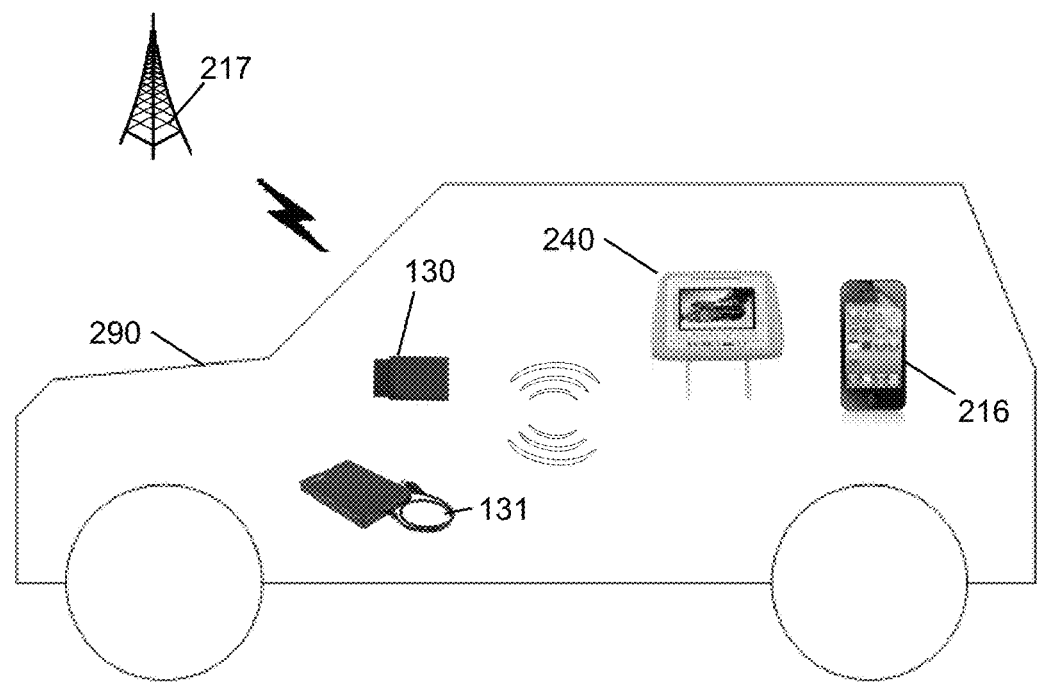

In FIGS. 2E-2F, a vehicle system 280 is shown. In FIG. 2E, in one or more embodiments, a partial view of a vehicle cabin is shown, where a subscriber identity module (SIM) card 260 is plugged into (or built into) the vehicle instrument panel 210. In FIG. 2F, an entire vehicle cabin 290 is shown including the OBD or USB storage device 130-131 and other devices 240 and 216 for receiving streaming content from the storage device 130-131. In the vehicle system 280 of FIGS. 2E-2F, in-vehicle devices 216 and 240 can receive streaming, subscription-based content from the storage device 130-131 and can also receive content from a cellular-based wireless communication system, where an automotive on-board entertainment system can receiver cellular content.

Figure 2G:
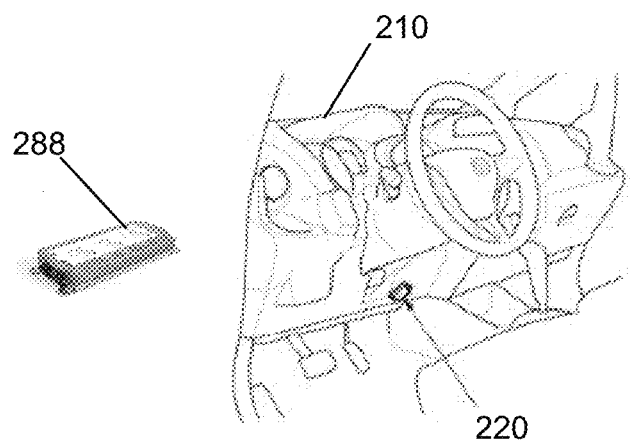
Figure 2H:
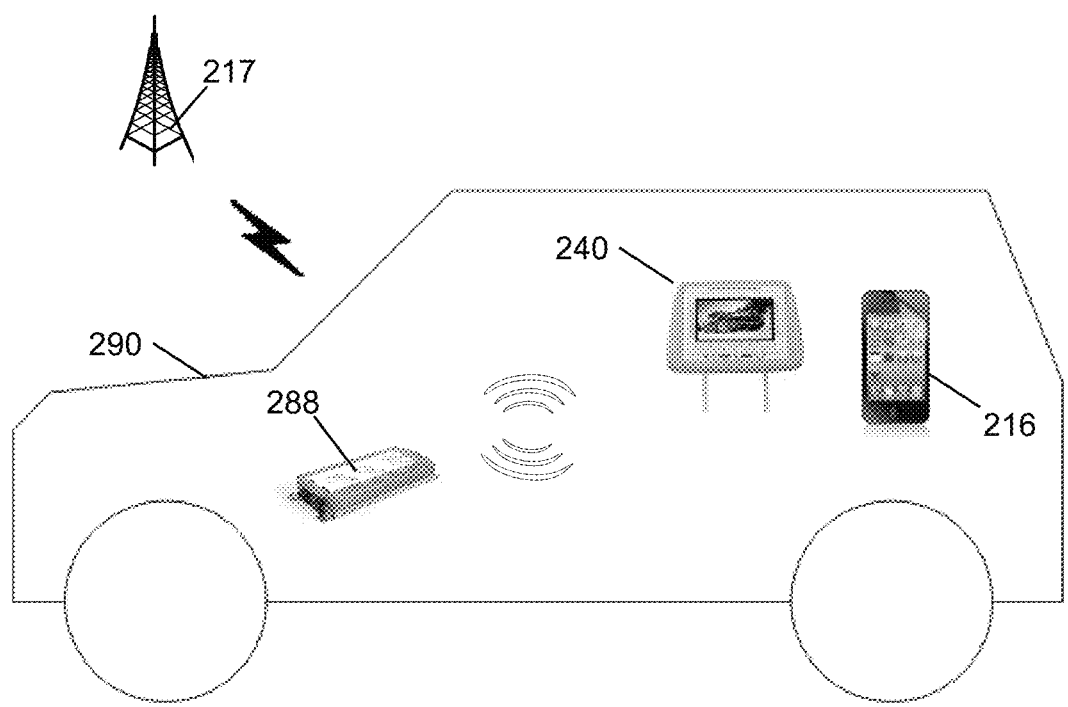

In FIGS. 2G-2H, a vehicle system 285 is shown. In FIG. 2G, in one or more embodiments, a partial view of a vehicle cabin is shown, where a vehicle-based storage device 288 is plugged into (or built into) the vehicle instrument panel 210. The vehicle-based storage device 288 can be built into a vehicle Telematic Control Unit (TCU) or Entertainment System (ES). In FIG. 2H, an entire vehicle cabin 290 is shown including the vehicle-based storage device 188 and other devices 240 and 216 for receiving streaming content from the vehicle-based storage device 188. In the vehicle system 285 of FIGS. 2G-2H, in-vehicle devices 216 and 240 can receive streaming, subscription-based content from the vehicle-based storage device 188 and can also receive content from a cellular-based wireless communication system, where an automotive on-board entertainment system can receiver cellular content.

Referring again to FIGS. 2A-2B, an OBD or USB storage device 130-131 can be plugged into a vehicle 230. In one embodiment, the storage device 130-131 can be plugged into the instrument panel 210 of the vehicle. The instrumental panel, or another convenient location in the vehicle 230 can include a port 220 into which the storage device 130-131 can be plugged. In one embodiment, the port 220 can be an OBD (or OBD2) type of port 220A, which can provide external access to a data bus of the vehicle 230. An OBD type of port 220A can provide access to one or more electronics systems within the vehicle 230 for reading various data values and/or diagnostic codes. The OBD type of port 220A can also enable an external device to input data into the data bus for communicating with one or more electronics systems within the vehicle 230. The OBD type of port 220A can allow the storage device 130-131 to send and/or receive information with an automotive on-board entertainment (AOBE) system. In one embodiment, the OBD type of port 220A can simply provide a power supply for the storage device 130. In one embodiment, the port 220 can be a vehicle power port 220B, also known as a 12 Volt supply or a cigarette lighter port. The vehicle power port 220B can simply provide a power supply for the storage device 130-131. In one embodiment, the port 220 can be a USB type of port 220C. The USB type of port 220C can provide data access to one or more electronic systems on the vehicle 230, including the same systems and/or data bus accessible via the OBD type of port 220A, the USB type of port 220C can simply provide a power supply for the storage device 130-131.

In one or more embodiments, an OBD or USB storage device 130-131 can power up upon sensing a power supply at the port 220. In one embodiment, the storage device 130-131 can detect the type of supply (the voltage level and/or voltages and multiple pins of the storage device 130-131) to determine that it has been plugged into a vehicle or a remote location (with respect to the premises location described in FIG. 1). In one embodiment, the storage device 130-131 can determine its location based on data that is received at the port 220, such as data received at an OBD-type port 220A or a USB-type port 220C. For example, the storage device 130-131 can determine that it is connected to an active OBD data bus, USB data bus, and/or an active and known electronic system or subsystem of a vehicle 230. In one embodiment, the storage device 130-131 can boot up and then detect the presence of other devices via wireless communication. Once the storage device 130-131 detects the presence (or absence) of certain devices and/or wireless networks, the storage device 130-131 can conclude that it is located in a vehicle 230.

Referring again to FIGS. 2A-2H, in one or more embodiments, after a storage device 130, 131, or 288 boots up and determines that it is operating in a vehicle (or other remote location), then the storage device 130, 131, or 288 can enter its broadcast mode. In broadcast mode, the storage device 130, 131, or 288 can transmit a wireless signal to indicate to all nearby devices 216 and 240 an offer of the content that is stored on the storage device 130, 131, or 288. In one embodiment, the content that is offered is subscription-based content that has been downloaded onto the storage device 130, 131, or 288 during a period of time when the storage device 130, 131, or 288 in communication with subscription content server 145. In one embodiment, the content is not subscription based. In one or more embodiments, the storage device 130, 131, or 288 can generate its own WLAN network for use at the vehicle 230. For example, the storage device 130, 131, or 288 can generate a WLAN that is accessible to devices, such as mobile communication devices 216 that are brought into the vehicle 230 and/or media presentation devices 240, such as in-seat display devices that are built into seatbacks of the vehicle 230. The in-vehicle devices 216 and 240 can join the LAN of the storage device 130, 131, or 288 to preview and/or receive the entirety of the content that is offered. In one embodiment, the storage device 130, 131, or 288 can provide metadata with the offer of content. The metadata can describe the offered content sufficient for users of the in-vehicle devices 216 and 240 to make informed choices about accepting/ rejecting the offer.

In one or more embodiments, one or more in-vehicle devices 216 and 240 accept the offer, then the storage device 130, 131, or 288 can transmit a stream of the content via its wireless link and/or LAN network. The storage device 130, 131, or 288 can list several content items. In one embodiments, the storage device 130, 131, or 288 can provide a playlist of content items that have been previously downloaded to the storage device 130, 131, or 288 during the storage mode. In-vehicle devices 216 that have connected to the storage device 130, 131, or 288 can choose to play the entire playlist, in order, or can pick and choose items for immediate playback. In one embodiment, the storage device 130, 131, or 288 can be limited to streaming one content item at a time as a general broadcast to any or all of the devices 216 and 240 in the vehicle. In another embodiment, the storage device 130, 131, or 288 can stream multiple items at the same time to handle situations where different users of in-vehicle devices want to view different content items that are stored on the storage device 130.

In one or more embodiments, the storage device 130, 131, or 288 can provide its own WLAN network for distribution of content via streaming. Alternatively, the storage device 130, 131, or 288 can use a WLAN network of the vehicle, if such a network is available. For example, an on-board entertainment system can provide a local router and WiFi connection for in-vehicle devices 216 and 240 (portable as well as built-in devices), where the router is further connected to a device, such as a user's cellular phone 216, that is connected to the a cellular data channel. In this embodiment, rather than connecting to an external cellular data channel (and using valuable data plan resources) the in-vehicle router could connect to the storage device 130, 131, or 288, which can act at the "source" channel for the router to distribute to the other devices 216 and 240. In this way, the storage device 130, 131, or 288 can provide streaming content services to an unconnected vehicle without using a data plan. In this embodiment, the storage device 130, 131, or 288 can physically connect to the in-vehicle WLAN resource either via its wireless capability or via the vehicle data bus using the OBD port.

In one or more embodiments, the storage device 130 can stream subscription-based content to in-vehicle devices 216 and 240 as if those devices were connected to a media processor device 206 in a premises with a subscription service. In one embodiment, the storage device 130, 131, or 288 can, if needed, verify that the users of the in-vehicle devices 216 and 240 have permission to view the subscription-based content. For example, if the subscription-based content includes DRM information that specifies users or a user code associated with a subscription package, then the storage device 130, 131, or 288 can verify the in-vehicle devices 216 enter the user code prior to receiving the streaming content.

In one or more embodiments, the storage device 130, 131, or 288 can also be used in extend capabilities of the vehicle 270 to include cellular communications. The storage device 130, 131, or 288 can include a cellular transceiver capability and a SIM card for activating the storage device 130, 131, or 288 to receive data from a cellular communication network 217. In one embodiment, by plugging in the storage device 130 with cellular capability and SIM card 260, a non-cellular-capable vehicle 270 can be made into a cellular-capable vehicle 270. In one or more embodiments, in-vehicle devices 216 and 240 can receive streaming, subscription-based content from the storage device 130, 131, or 288 and can also receive content from a cellular-based wireless.

In one or more embodiments, the storage device 130, 131, or 288 can also be used in extend capabilities of a vehicle that already includes cellular communications. Here, the automotive entertainment system can include an ability for the vehicle to receiver cellular data, along with an activating SIM card 260 in the instrument panel 210 of the vehicle. While the cellular-capable vehicle has more capability for bringing content into the vehicle environment, access to such content can use up valuable cellular data plan resources. By plugging in the storage device 130, 131, or 288, in this scenario, streaming, subscription-based content can be provided by the storage device 130, 131, or 288 to reduce dependence on (and costs associated with) cellular-based data downloads.

In one or more embodiments, consumers may desire access to content and data on the go, including in vehicles and including situations when cellular data coverage may or may not be available. By providing customers with an ability to download stored content/data from their home through a home network to a vehicle on-board entertainment system, a storage device can improve customer experiences while reducing dependence upon cellular data. Stored content can be streamed from a hard drive in the storage device through the vehicle via WiFi/NFC to in-vehicle device—whether the devices are brought into the vehicle (e.g., smart phones, tablets, notebooks, or PCs) or embedded devices (OEM DVD players, in-seat displays, or head-up displays). For customers of subscription-based content services, such as DirecTV™, the storage device can provide significant added value. The storage device 130 can allow subscription-based content services customers to add a package to their vehicle that can extend their premises-based entertainment options and experiences into their connected and non-connected vehicles. The storage device can provide an aftermarket value-add solution to non-connected vehicles that can use the vehicle OBD port, USB port, and/or Power-outlet to plug-in the device for power. In another embodiment, the storage device 130 can be a value solution to extend capabilities of connected vehicles that have built-in (embedded) wireless and WiFi connections into their vehicles. In another embodiment, vehicle manufacturers can provide the storage device as part of their factory-installed systems.

In one or more embodiments, users can download and store content for viewing in the storage device and experience this content in their vehicle while they are away from home. The storage device can be used to select DVR content and control what the passengers/kids can watching in the back seat without having to manage DVD's and/or to bear the cost of live streaming etc. The storage device can provide real-time access to video content and other stored data in vehicles, while not using up expensive cellular data resources nor tying up cellular phones with Hot Spot activities. The stored content and data can be moved from vehicle to vehicle. Further, the storage device can be used to store content or user data offsite from the user's premises to support and improver data survivability. The availability of this service is highly likely to elevated customer satisfaction while driving subscriptions to subscription-based services. In addition, by reducing dependence upon cellular-based data streaming and/or downloading, the storage device can reduce high bandwidth demands on mobility networks while providing improved quality of service when users are in areas of high congestion or spotty coverage.

Figure 3:
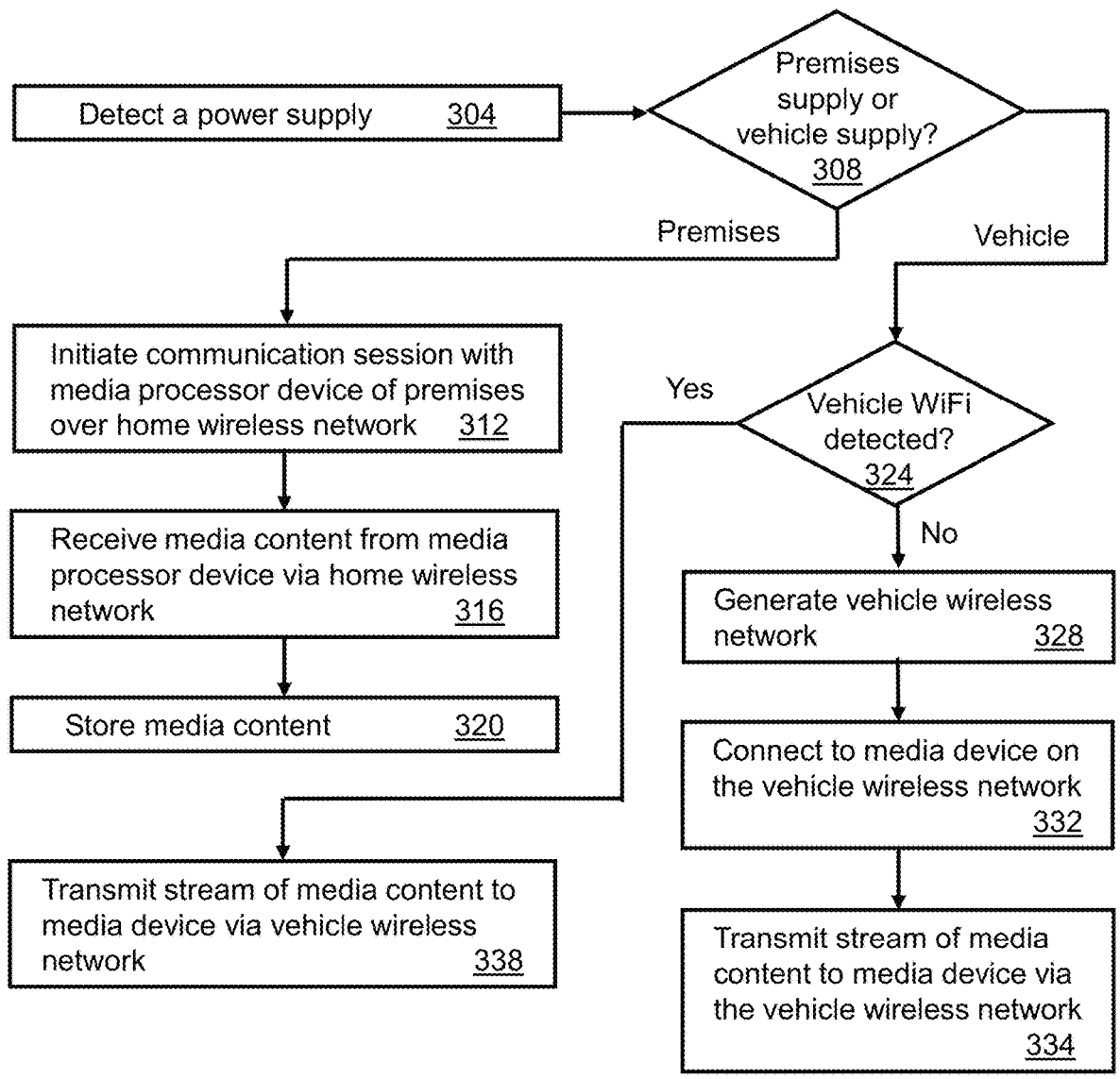
FIG. 3 depicts an illustrative embodiment of a method used in portions of the systems described in FIGS. 1 and 2A-2H.

FIG. 3 depicts an illustrative embodiment of a method used in portions of the systems described in FIGS. 1 and 2A-2H. In step 304, the storage device can detect a power supply. When a power supply is available to the storage device, then the storage device can boot up into an active state. In step 308, the storage device can determine if the power supply is a premises supply or a vehicle supply. The storage device can determine this based on pin out, voltage levels, the presence or absence of signals, and so forth. The storage device can also determine its location based on presence and/or identifying information associated with a WLAN network. If the storage device identifies its location as a premises, then the storage device can enter a storage mode. If the storage device identifies its location as a vehicle, then the storage device can enter a broadcast mode. In step 312, the storage device can initiate a communication session with a media processor device or a WLAN coupled to a media processor device 206 or other subscriber-connected device of the premises over a home wireless network. In step 316, the storage device can receive media content from the media processor device via the home wireless network. In step 320, the storage device can store the media content from the media processor device 106.

In step 324, where the storage device is a vehicle, then the storage device can detect if a vehicle WiFi is available. For example, an in-vehicle entertainment system can support an in-vehicle WiFi for transporting data to devices in the vehicle cabin. If no in-vehicle WiFi is detected, then the storage device can generate a vehicle wireless network in step 328. In step 332, the storage device can connect to a media device in the vehicle via the vehicle wireless network of the storage device and can transmit a stream of media content to the media device in step 334. If the vehicle has its own WiFi system, the storage device can use this wireless system to transmit the stream of media content to the media device in step 338.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
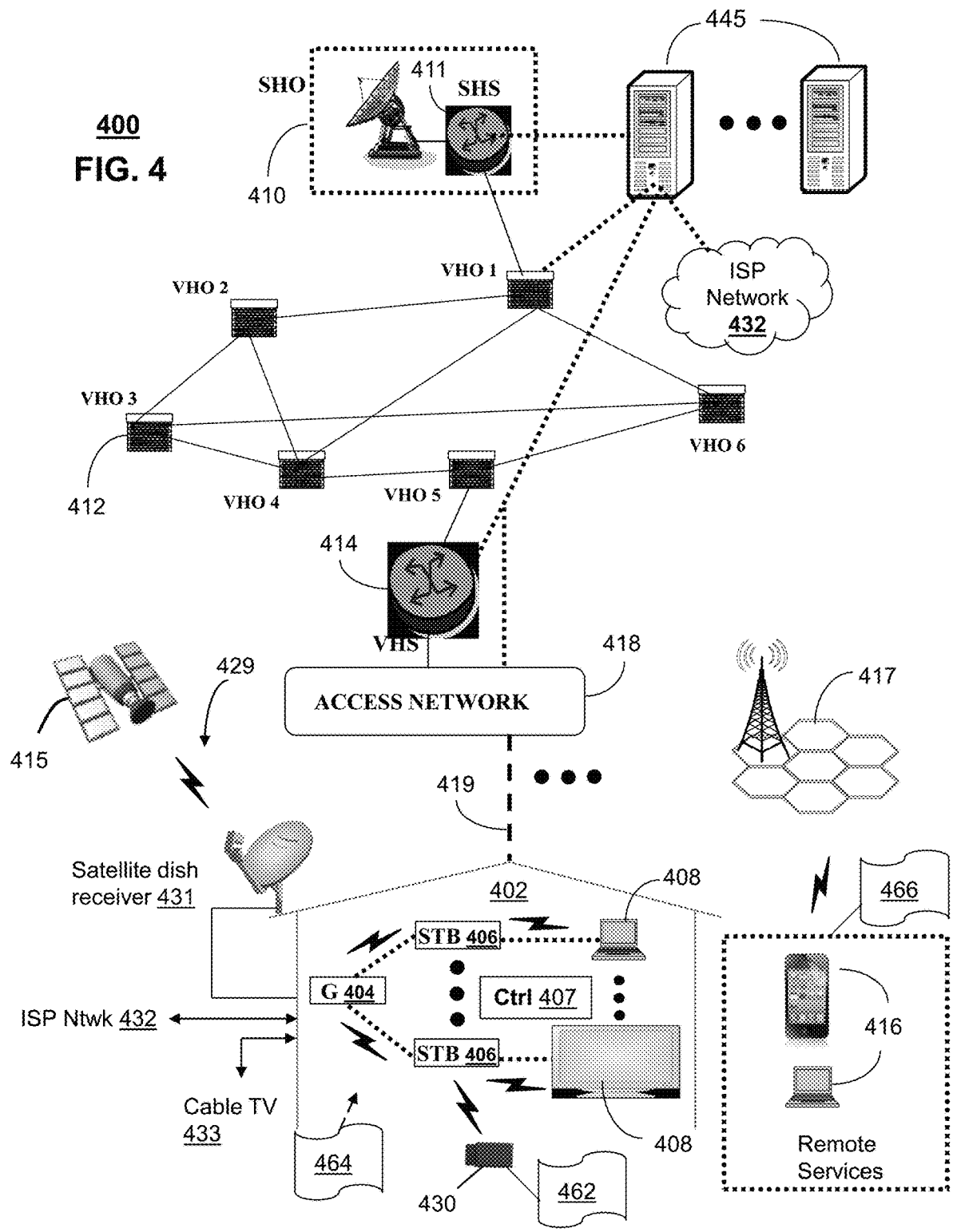
FIGS. 4-5 depict illustrative embodiments of communication systems that provide media services for use by the content distribution and extended access systems of FIGS. 1 and 2A-2H.

FIG. 4 depicts an illustrative embodiment of a first communication system 400 for delivering media content. The communication system 400 can represent an Internet Protocol Television (IPTV) media system. Communication system 400 can be overlaid or operably coupled with the systems 100, 200, 250, and 280 of FIGS. 1 and 2A-2H as another representative embodiment of communication system 400. For instance, one or more devices illustrated in the communication system 400 of FIG. 4 for receiving media content from a media processor device via a first wireless communication network, storing the media content received from the media processor device, accessing a second wireless communication network generated by the in-vehicle communication system, connecting, via the second wireless communication network, to a media device detected on the second wireless communication network, and transmitting a stream of the media content to the media device via the second wireless communication network.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 445, a portion of which can operate as a web server for providing web portal services over the ISP network 432 to wireline media devices 408 or wireless communication devices 416. Communication system 400 can also provide for all or a portion of the computing devices 445 to function as a subscription content server 445. A storage device 430 can use computing and communication technology to perform function 462, which can include among other things, the techniques described by method 300 of FIG. 3. For instance, function 462 of storage device 430 can be similar to the functions described for storage devices 130-132 of FIG. 1, and storage devices 130, 131, and 288 of 2A-2H, in accordance with method 300 of FIG. 3. The media processors 406 and wireless communication devices 416 can be provisioned with software functions 464 and 466, respectively, to utilize the services of storage device 430. For instance, functions 464 and 466 of media processors 406 and wireless communication devices 416 can be similar to the functions described for the media processor devices 106 and communication devices 116, 116B, 216, and 240 of FIGS. 1 and 2A-2H in accordance with method 300.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
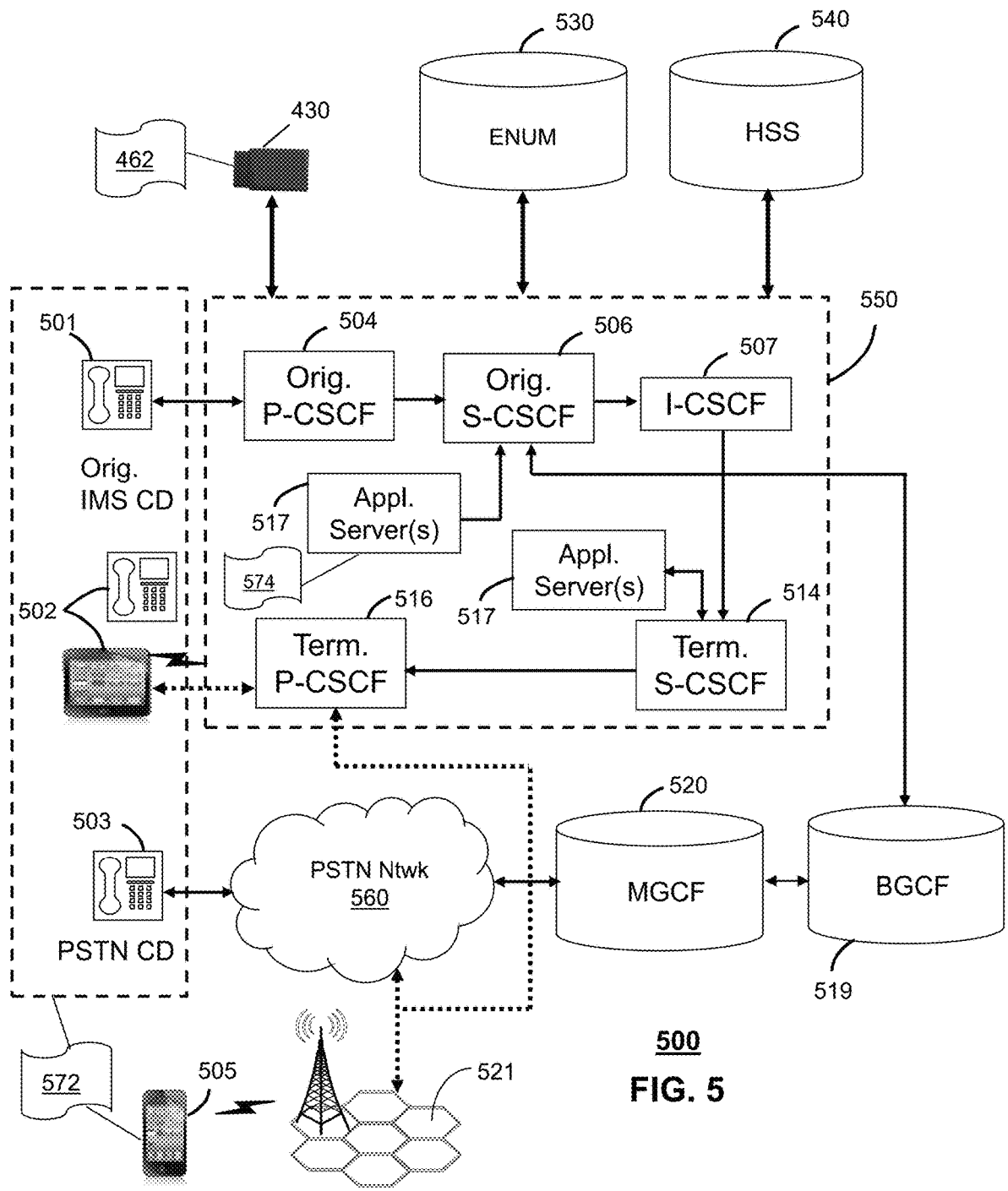

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with systems 100, 200, 250, and 280 of FIGS. 1 and/or 2A-2H and communication system 400 as another representative embodiment of communication system 400, for receiving media content from a media processor device via a first wireless communication network, storing the media content received from the media processor device, accessing a second wireless communication network generated by the in-vehicle communication system, connecting, via the second wireless communication network, to a media device detected on the second wireless communication network, and transmitting a stream of the media content to the media device via the second wireless communication network.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The storage device 430 of FIG. 4 can be operably coupled to communication system 500 for purposes similar to those described above. Storage device 430 can perform function 462 and thereby provide streaming content services to the CDs 501, 502, 503 and 505 of FIG. 5 similar to the functions described for storage device 430 of FIG. 4 in accordance with method 300 of FIG. 3. CDs 501, 502, 503 and 505, which can be adapted with software to perform function 572 to utilize the services of the storage device 430 similar to the functions described for communication devices 104, 106, 108, 116, and 116B of FIG. 1 in accordance with method 300 of FIG. 3. Storage device 430 can provide functions that are also an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
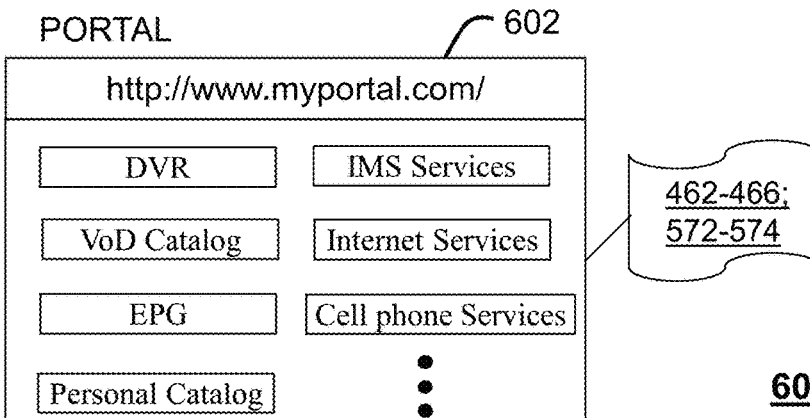
FIG. 6 depicts an illustrative embodiment of a web portal for interacting with the communication systems of FIGS. 1 and 2A-2H, and 4-5.
Figure 6:
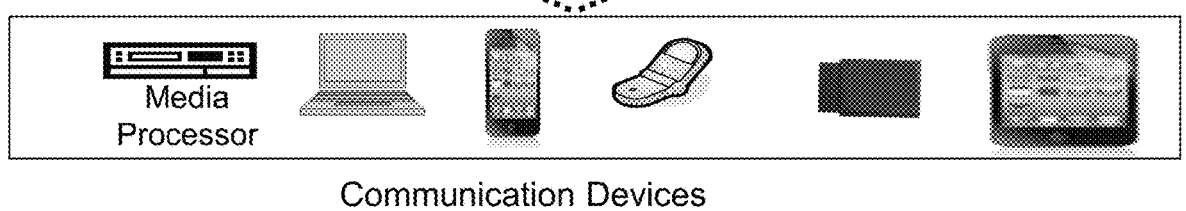

FIG. 6 depicts an illustrative embodiment of a web portal 602 of a communication system 600. Communication system 600 can be overlaid or operably coupled with systems 100, 200, 250, and 280, of FIGS. 1 and/or 2A-2H, communication system 400, and/or communication system 500 as another representative embodiment of systems XXX of FIGS. 1 and/or 2], communication system 400, and/or communication system 500. The web portal 602 can be used for managing services of systems 100, 200, 250, and 280, of FIGS. 1 and/or 2A-2H, and communication systems 400-500. A web page of the web portal 602 can be accessed by a Uniform Resource Locator (URL) with an Internet browser using an Internet-capable communication device such as those described in FIGS. 1 and/or 2A-2H and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and/or service providers of systems 100, 200, 250, and 280, of FIGS. 1 and/or 2A-2H, and communication systems 400-500. For instance, users of the services provided by the storage device 430 can log into an on-line accounts and provision the storage device 430 with a user profile or configuration to enable it to communication with devices described in FIGS. 1-5, and so on. Service providers can log onto an administrator account to provision, monitor and/or maintain the systems 100, 200, 250, and 280, of FIGS. 1 and/or 2A-2H.

Figure 7:
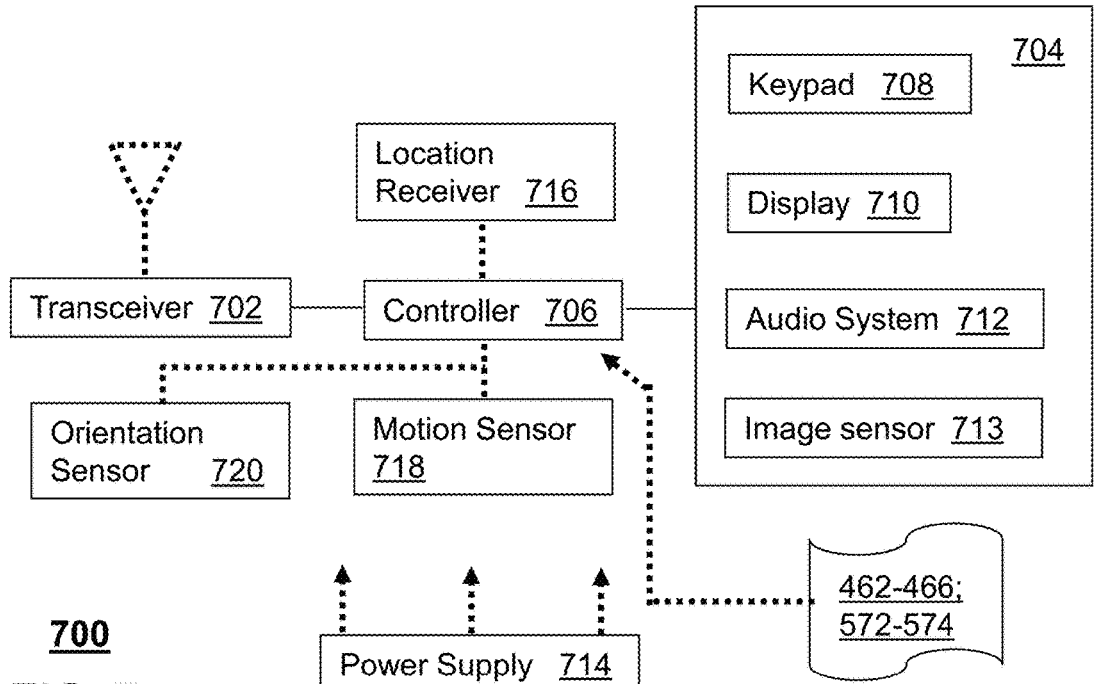
FIG. 7 depicts an illustrative embodiment of a communication device.

FIG. 7 depicts an illustrative embodiment of a communication device 700. Communication device 700 can serve in whole or in part as an illustrative embodiment of the devices depicted in [systems 100, 200, 250, and 280, of FIGS. 1 and/or 2A-2H, and FIGS. 4-5 and can be configured to perform portions of method 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of systems 100, 200, 250, and 280, of FIGS. 1 and/or 2A-2H, the media processor 406, the media devices 408, or the portable communication devices 416, the storage device 430 of FIG. 4, as well as the IMS CDs 501-502 and PSTN CDs 503-505 of FIG. 5. It will be appreciated that the communication device 700 can also represent other devices that can operate in systems 100, 200, 250, and 280, of FIGS. 1 and/or 2A-2H, communication systems 400-500 of FIGS. 4-5 such as a gaming console and a media player. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
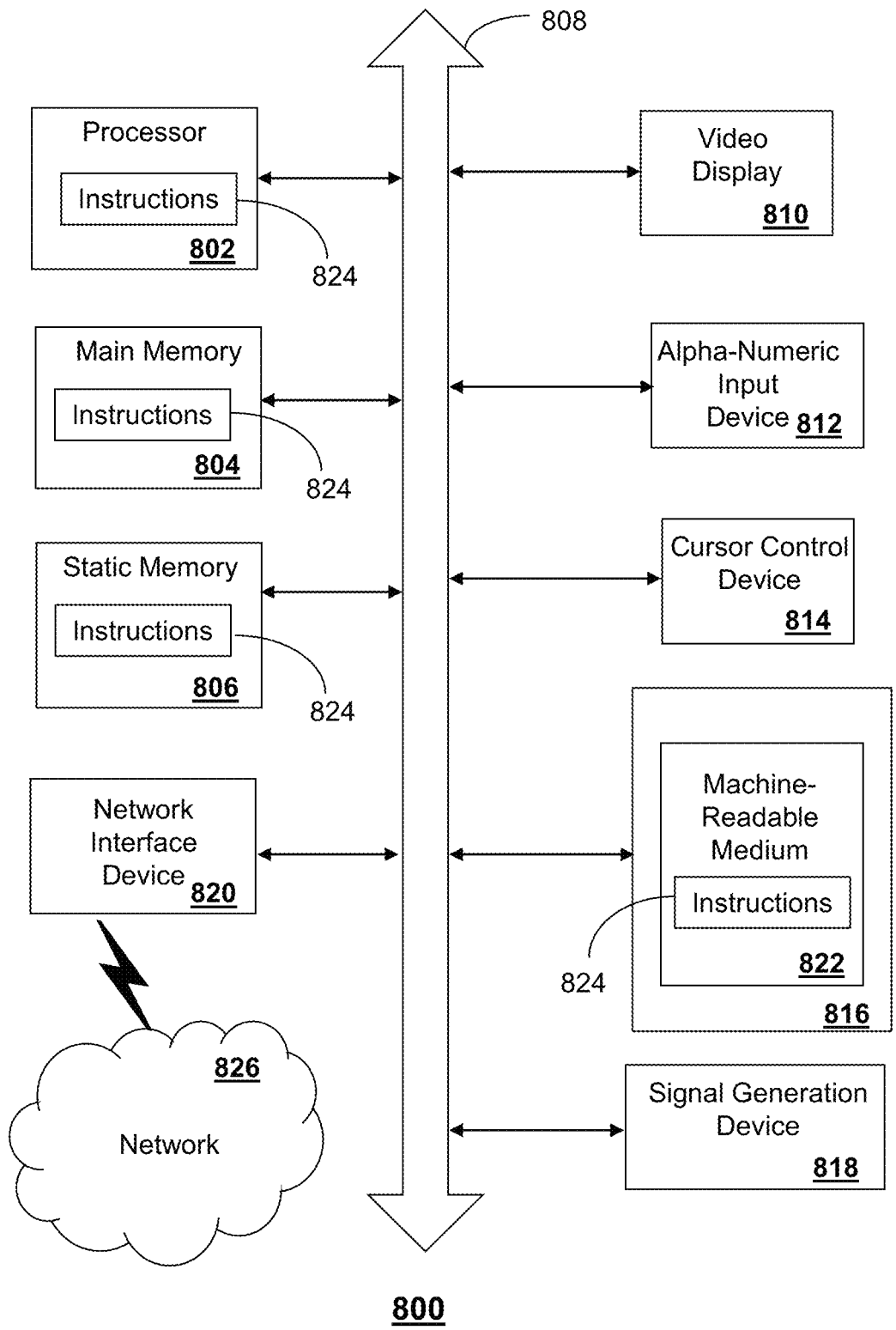
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the storage device 430, the media processor 406, mobile communication devices 416, and other devices of FIGS. 1, 2A-2H, 4, and 5. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to:

solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and/or HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory machine-readable storage medium, comprising executable instructions that, when executed by a processing system including a processor, facilitate performance of operations at a portable storage device, comprising:

determining, by the portable storage device, whether the portable storage device is mechanically and electrically plugged into a premises interface associated with a premises or whether the portable storage device is mechanically and electrically plugged into a vehicle interface associated with a vehicle;

responsive to determining that the portable storage device is plugged into the premises interface:
  initiating a communication session with a media processor apparatus associated with the premises over a first wireless communication network;
  receiving media content from the media processor apparatus via the first wireless communication network, wherein the media content is received at the media processor apparatus from a subscription media source and wherein the media content includes at least some subscription content; and
  storing in the portable storage device the media content received from the media processor apparatus; and subsequent to storing in the portable storage device the media content received from the media processor apparatus, and responsive to determining by the portable storage device that the portable storage device no longer plugged into the premises interface and is mechanically and electrically plugged into the vehicle interface:
  generating, by the portable storage device, a second wireless communication network to support a local wireless area network of the portable storage device;
  initiating a first connection, via the local wireless area network of the portable storage device, to a media device associated with the vehicle detected on the local wireless area network; and
  transmitting a stream of the media content to the media device from the portable storage device via the local wireless area network of the portable storage device, wherein the stream of the media content includes the at least some subscription content, wherein the media device reproduces the media content from the stream of the media content.

2. The non-transitory machine-readable storage medium of claim 1, wherein, further responsive to determining that the portable storage device is mechanically and electrically plugged into the vehicle interface, the operations further comprise:
  initiating a second connection to a cellular wireless communication network;
  receiving second media content from the cellular wireless communication network; and
  transmitting a second stream of the second media content to the media device via the second wireless communication network.

3. The non-transitory machine-readable storage medium of claim 2, wherein the second connection to the cellular wireless communication network is via a cellular transceiver of the portable storage device.

4. The non-transitory machine-readable storage medium of claim 2, wherein the second connection to the cellular wireless communication network is via a cellular transceiver of an in-vehicle communication system.

5. The non-transitory machine-readable storage medium of claim 2, wherein, further responsive to determining that the portable storage device is mechanically and electrically plugged into the vehicle interface, the operations further comprise:
  identifying a subscriber identity module associated with the cellular wireless communication network; and
  transmitting authentication information stored at the subscriber identity module to the cellular wireless communication network.

6. The non-transitory machine-readable storage medium of claim 5, wherein the subscriber identity module is identified at the portable storage device.

7. The non-transitory machine-readable storage medium of claim 5, wherein the subscriber identity module is identified at an in-vehicle communication system.

8. The non-transitory machine-readable storage medium of claim 1, wherein, further responsive to determining that the portable storage device is plugged into the vehicle interface, the operations further comprise sensing a power supply of the vehicle interface.

9. The non-transitory machine-readable storage medium of claim 1, wherein the determining whether the portable storage device is mechanically and electrically plugged into the premises interface associated with the premises or whether the portable storage device is mechanically and electrically plugged into a vehicle interface associated with a vehicle comprises determining voltage levels of one or more pins associated with the premises interface or the vehicle interface.

10. The non-transitory machine-readable storage medium of claim 1, wherein the media device is a device that is present in a vehicle.

11. The non-transitory machine-readable storage medium of claim 1, wherein the media device is embedded in a vehicle.

12. The non-transitory machine-readable storage medium of claim 1, wherein the vehicle interface is provided through an on-board diagnostics port.

13. The non-transitory machine-readable storage medium of claim 1, wherein the vehicle interface is provided through a vehicle accessory system.

14. The non-transitory machine-readable storage medium of claim 1, wherein the determining whether the portable storage device is mechanically and electrically plugged into a premises interface or a vehicle interface comprises determining voltage levels of one or more pins associated with the premises interface or the vehicle interface.

15. The non-transitory machine-readable storage medium of claim 1, wherein the determining whether the portable storage device is mechanically and electrically plugged into a premises interface comprises determining, by the portable storage device, that the portable storage device is mechanically and electrically plugged into a media processor device.

16. A portable storage device, comprising:
  a processing system including a processor; and
  a memory that stores executable instructions that, when executed by the processing system, facilitate performance of operations, comprising:
  electrically connecting the portable storage device to a premises interface associated with a premises;
  responsive to the connecting the portable storage device to the premises interface, receiving media content from a media processor device associated with the premises via a first wireless communication network, wherein the media content is received at the media processor device from a subscription media source and wherein the media content includes at least some subscription content;
  storing the media content received from the media processor device;
  subsequent to storing the media content received from the media processor device, disconnecting the portable storage device from the premises interface and electrically connecting the portable storage device to a vehicle interface associated with a vehicle;

generating a second wireless communication network to support a local wireless area network of the portable storage device responsive to connecting the portable storage device to the vehicle interface;

initiating a first connection, via the local wireless area network of the portable storage device, to a media device associated with the vehicle and detected on the local wireless area network of the portable storage device; and transmitting a stream of the media content to the media device from the portable storage device via the local wireless area network of the portable storage device, wherein the stream of the media content includes the at least some subscription content, wherein the media device reproduces the media content from the stream of the media content.

17. The portable storage device of claim 16, wherein the operations further comprise:

initiating a second connection to a cellular wireless communication network;

receiving second media content from the cellular wireless communication network; and transmitting a second stream of the second media content to the media device via the second wireless communication network.

18. The portable storage device of claim 17, wherein the operations further comprise:

identifying a subscriber identity module associated with the cellular wireless communication network; and transmitting authentication information stored at the subscriber identity module to the cellular wireless communication network.

19. The portable storage device of claim 16, wherein the media device is embedded in a vehicle.

20. A method, comprising:

receiving, by a portable storage device including a processing system including a processor, media content from a media processor device associated with a premises via a first wireless communication network while the portable storage device including the processing system is mechanically and electrically plugged into a premises interface associated with the premises, wherein the media content includes at least some subscription content and is received at the media processor device from a subscription media source;

storing, by the processing system, the media content received from the media processor device;

subsequent to storing the media content received from the media processor device, disconnecting the portable storage device including the processing system from the premises interface and mechanically and electrically plugging the portable storage device to a vehicle interface to initiate a first connection, by the processing system, to an in-vehicle communication system associated with a vehicle;

generating, by the processing system, a second wireless communication network to support a local wireless area network of the processing system, wherein the generating is responsive to initiating the first connection to the in-vehicle communication system;

initiating a second connection, by the processing system and via the local wireless area network of the processing system, to a media device associated with the vehicle and detected on the local wireless area network of the processing system; and transmitting, by the processing system, a stream of the media content to the media device via the local wireless area network of the processing system, wherein the stream of the media content includes the at least some subscription content, wherein the media device reproduces the media content from the stream of the media content.

* * * * *